United States Patent [19]

Brekke

[11] Patent Number: 4,917,074
[45] Date of Patent: Apr. 17, 1990

[54] DIRECT GAS-FIRED HEATING AND VENTILATION METHOD AND APPARATUS

[75] Inventor: Dale J. Brekke, Culleoka, Tenn.

[73] Assignee: Saturn Corporation, Troy, Mich.

[21] Appl. No.: 331,721

[22] Filed: Apr. 3, 1989

[51] Int. Cl.$^4$ .............................................. F24H 3/02
[52] U.S. Cl. ............................ 126/110 A; 126/116 A; 126/110 R
[58] Field of Search ......... 126/99 D, 110 A, 110 AA, 126/110 R, 116 A, 116 R, 285 R, 110 C, 112

[56] References Cited

U.S. PATENT DOCUMENTS

| | | | |
|---|---|---|---|
| 4,325,352 | 4/1982 | Dirkes | 126/110 A |
| 4,429,679 | 2/1984 | Dirkes | 126/110 A |
| 4,573,912 | 3/1986 | Albritton et al. | 126/110 C |
| 4,674,475 | 6/1987 | Powis | 126/110 B |

Primary Examiner—Larry Jones
Attorney, Agent, or Firm—Ronald L. Phillips

[57] ABSTRACT

A direct gas-fired heating and ventilating system for industrial and commercial buildings and the like comprises a direct gas-fired burner, fresh air dampers, fresh air bypass dampers and recirculation dampers.

4 Claims, 2 Drawing Sheets

DIRECT GAS-FIRED HEATING AND VENTILATION METHOD AND APPARATUS

TECHNICAL FIELD

This invention relates to direct gas-fired heating and ventilating systems for industrial and commercial buildings and the like and more particularly to using variable amounts of fresh air therein.

BACKGROUND OF THE INVENTION

There are current two types of direct gas-fired heating and ventilating systems used in industrial and commercial buildings and the like to meet the needs of make-up air for that which is exhausted from the building. Basic to both systems is the supplying of heated air into a building by passing fresh outside air directly over a gas flame with the burner utilizing the kinetic energy of the air flow to complete combustion without adverse by-products prior to delivery into the building space. In one type of system, 100 percent outside air is supplied to the gas flame and thence in a thus heated condition into the building to replace that amount of air which is exhausted. Moreover, in such a system, it is also possible to bring in an excess of make-up air over that exhausted to ensure a positive pressure in the area to prevent outside air infiltration and cold drafts, down or backdrafts in heating equipment flues, ventilators and stacks, and to compensate for reduced exhaust fan air volumes that could result in inadequate removal of possible contaminants. Normally, the exhaust system in this type of arrangement is interlocked with a make-up air system so that both units are in operation at the same time. During operation of this type of direct gas fired system, air flow is continuous with the discharge of air normally regulated either by modulating the gas flow or by electronic gas flame modulation. In either event, each of these control systems allows the burner to operate at any point on its turn-down range to provide a constant heater air discharge temperature.

In the other type of conventional direct gas-fired heating and ventilating system, there is incorporated a return air damper downstream of the direct gas-fired burner which provides an option of 50 percent fresh air and 50 percent return air, or 100 percent fresh air and no return air. The latter mode is generally recommended for multiple exhaust fan installations and other applications with variable exhaust air requirements recognizing that less fuel is expended to heat less make-up air. In a system with multiple exhaust fan applications, the 100 percent fresh air damper position is established when all the exhaust fans are operating. On the other hand with only one fan in operation, the unit is typically switched to handle 50 percent make-up air and 50 percent return air. This kind of system lends itself to those ventilation applications incorporating supplemental space heating with make-up air requirements. In such an application, the total air volume circulated need not be 100 percent make-up air but can be a mixture of 50 percent fresh air and 50 percent return air. However, since the heat output of the burner at the 50 percent fresh air and 50 percent return air condition must not be allowed to normally exceed one-half that of the 100 percent fresh air condition, the unit must be capable of providing needed supplementary heat at the reduced firing rate. And thus the later system has the same modulating discharge air control as in the fresh mentioned system and in addition has a fresh air/return air control.

While the above systems have proven generally satisfactory, they are at best a compromise as the total amount of air being handled and the amount of outside air being discharged by the air handling equipment must be held constant to ensure proper conditions for good combustion at the gas flame. A significantly better system would be where both the outside air and the return air could be modulated to satisfy any air conditioning and ventilation demand while heating or cooling.

SUMMARY OF THE PRESENT INVENTION

The present invention accomplishes the above objective with method and apparatus employing a variable bypass of fresh air around the gas flame that operates in conjunction with a variable amount of fresh air to the gas flame and a variable amount of return or recirculating air. According to the present invention, there is delivered a variable amount of fresh air from outside the building to a gas flame and thence in a thus heated condition into the building. In addition, a variable amount of fresh air is bypassed from outside the building around the gas flame and thence into the building. Moreover, a variable amount of air inside the building is recirculated. Given such an arrangement, the system is initially adjusted so that a predetermined pressure drop that will effect good efficient combustion occurs across the gas flame when there is no bypass flow and no recirculation flow. In one condition then the fresh air delivered to the gas flame and also the recirculated air are both modulated so that the predetermined pressure drop is maintained when there is no bypass flow. Alternatively, the fresh air delivered to the gas flame and also both the recirucalted air and the bypass air are all modulated so that the predetermined pressure drop is maintained when there is both bypass flow and recirculation. As a result, it has been found that there is afforded the capability of supplying varying quantities of outside air from as little as 40 percent up to 100 percent if so desired while maintaining good efficient combustion at the gas flame.

These and other objects, advantages and features of the present invention will becomes more apparent from the following description and drawing in which:

DESCRIPTION OF THE PREFERRED EMBODIMENT

Figure 1:
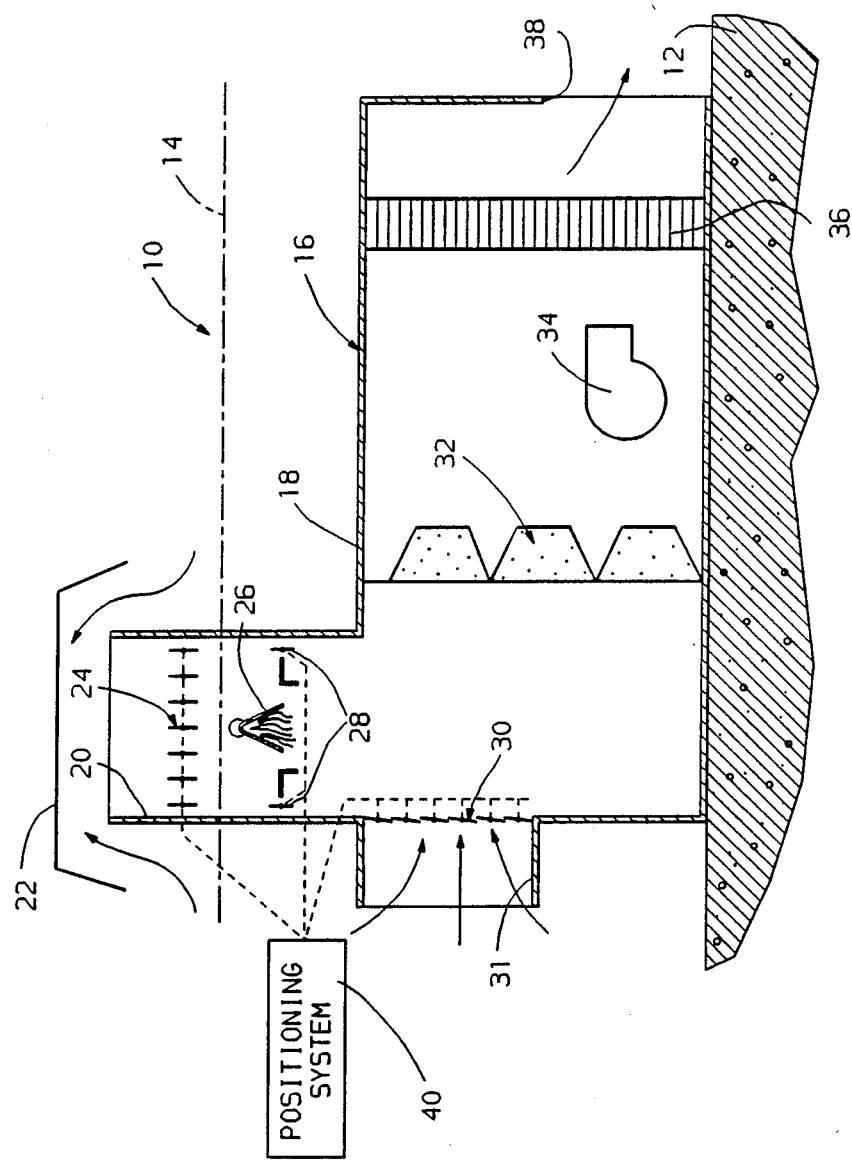
FIG. 1 is a diagrammatic representation in side elevation of an industrial building having a preferred embodiment of the direct gas-fired heating and ventilating system according to the present invention.

Referring to FIG. 1, there is shown an industrial building generally designated as 10 having a floor 12 and a roof 14 and within which is installed a direct gas-fired heating system generally designated as 16.

The system 16 comprises ducting 18 having an inlet stack 20 that extends through the roof and is open to the fresh air outside the building beneath a stack cover 22. A plurality of outside or fresh air dampers 24 are mounted in the inlet 20 immediately above a direct gas fired burner 26 of conventional type. Bypass air dampers 28 are mounted on opposite sides of the gas-fired burner 26 and together with the latter are located upstream of recirculation or return air dampers 30 that are mounted in a return air duct 31 open to the interior of the building. The outside air dampers 24 are adjustable to modulate or restrict the fresh air flow in the outside or fresh air duct 20 from no restriction to an absolute barrier with no flow. Similarly, the bypass air dampers 28 are adjustable to modulate or restrict the fresh air flow around the burner from no restriction to an absolute barrier. And also similarly, the return air dampers 30 are adjustable to modulate or restrict the return air flow in the return air duct 31 from no restriction to an absolute barrier with no flow. A plurality of air filters 32 are located across the ducting 18 between the burner 26 and the respective bypass and return air dampers 28 and 30. And a fan 34 which provides for forced air circulation and itself has a variable inlet vane operable to vary the amount being handled in the system is located in the ducting 18 immediately downstream of the filters. And finally there is provided a chilled water cooler 36 of conventional type located in the ducting 18 for cooling the filtered air prior to delivery out an outlet 38 of the system to the interior of the building.

Figure 2:
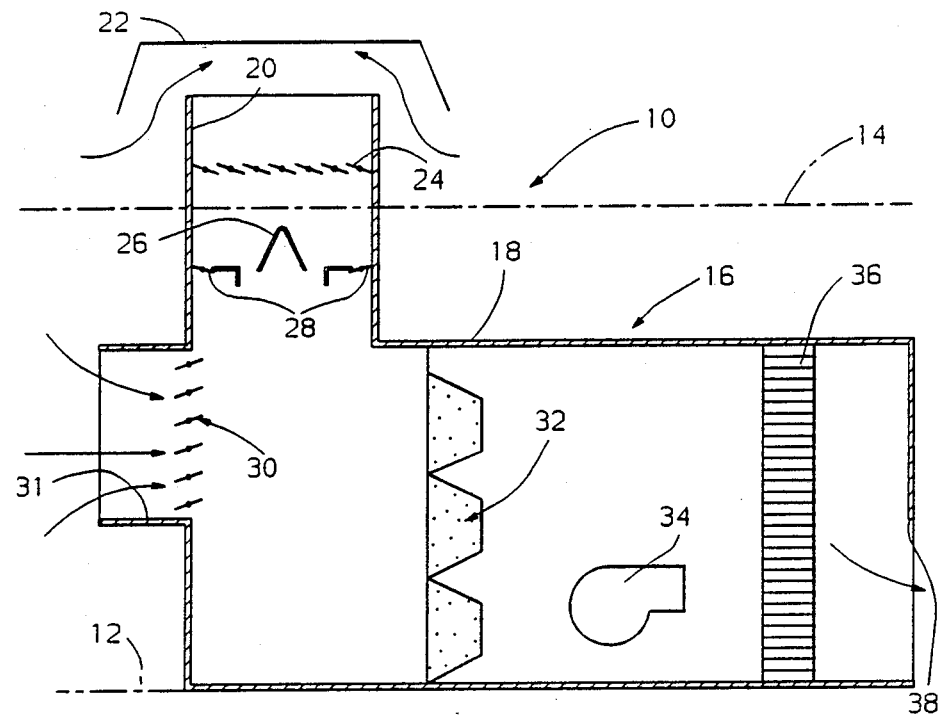
FIGS. 2 and 3 are similar to FIG. 1 but show the system in different operating modes.

As is well known, good combustion occurs when the proper mixture of gas and air is achieved to minimize carbon monoxide and maximize carbon dioxide. A good visual indication of good or effective combustion is a clear blue flame. It has been found that proper conditions of good combustion is maintained with a 0.30 to 0.77 inchs water column pressure difference or drop across the direct gas fired burner 26. According to the present invention, the variable amounts of air delivery by the dampers is adjusted to maintain good combustion and is accomplished as follows. Initially, with the equipment installed as shown in FIG. 1, the system is adjusted so that a predetermined pressure drop of preferably about 0.4–0.6 inches water column approximately centered in the above desired range occurs across the gas flame with the inlet dampers 24 wide open when there is the maximum allowed bypass flow and no recirculation (i.e. the bypass dampers 28 are full open and the recirculation damper 30 are closed) and thus 100% fresh air delivery. With the inlet dampers 24 and bypass dampers 28 wide open and the recirculation dampers 30 closed, the fan capacity is then adjusted to produce this pressure drop as well as meet the base make-up air and circulation requirements within the building. With the system thus initially adjusted, both the fresh air delivered to the gas flame and the recirculated air may then be modulated by operation of the fresh air, bypass and return air dampers 24, 28 and 30 so that the predetermined pressure drop is maintained by not permitting this pressure drop to fall below about 0.4 to 0.45 inches water column while there continues to be no bypass flow with the bypass dampers 28 closed. In this condition, which is shown in FIG. 2, there is obtained minimum delivery of outdoor air of for example about 40 percent with the outside dampers 24 almost closed and the return dampers almost fully open while the bypass dampers remain fully closed.

Figure 3:
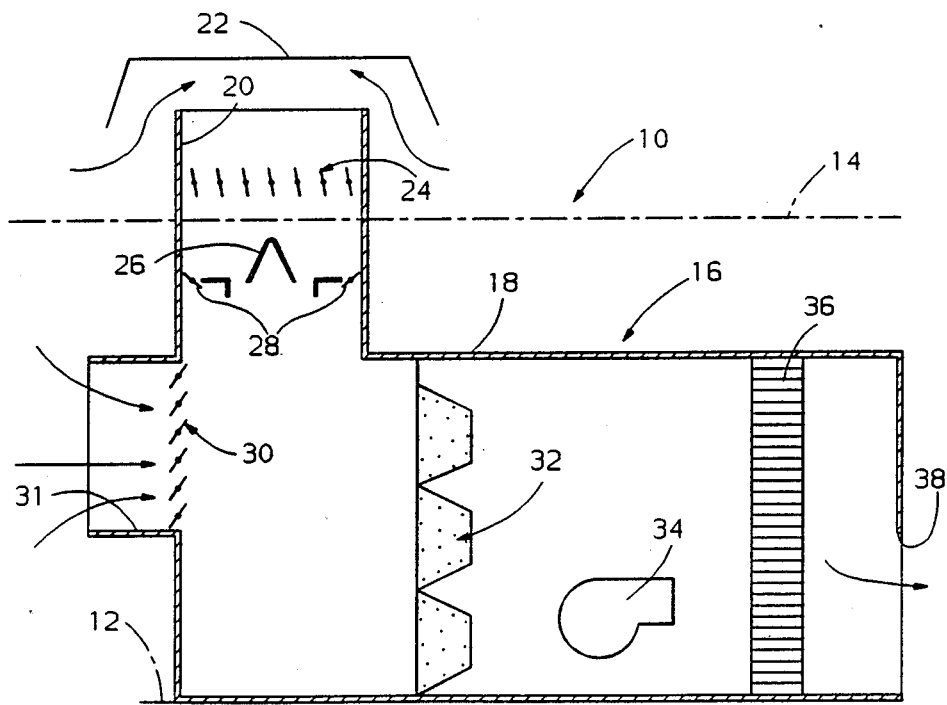

Then to supply additional outside air, the outside air, recirculated air and the bypass air are all simultaneously modulated with the outside air return air, and bypass air dampers 24, 30 and 28 so that the predetermined pressure drop is maintained by not permitting the pressure drop to fall below a slightly higher figure of about 0.45 to 0.55 inches water column when there is both bypass flow and recirculation. In this mode which is shown in FIG. 3, there is then available anywhere from about 50 to 90 percent outdoor air thus giving greater flexibility to matching the outside air needs to the amount of outside air that can be cost effectively delivered when heating of the outside air and building space is required. It will also be appreciated that in each of the above modes, the air may be chilled downstream of the burner by operation of the water cooler 36 to provide cooling as well as heating and ventilation.

Moreover, it will be appreciated that since all the operating conditions are determined empirically from the outside, bypass and return dampers, there is no need for sensors and feedback control to maintain the desired pressure drop across the burner. And thus the dampers may all be controlled by a simple conventional positioning system 40 comprised for example of electrical, mechanical and/or fluid actuators.

Thus the foregoing description of the preferred embodiment of the invention has been presented for purposes of illustration and description. It is not intended to be exhaustive or to limit the invention to the precise form disclosed. Obvious modifications and variations are possible in light of the above teaching. The embodiment was chosen and described to provide the best illustration of the principles of the invention and its practical application to thereby enable one of ordinary skill in the art to utilize the invention and various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A method of heating and ventilating a building such as industrial and commercial buildings and the like with a direct gas-fired system using variable amounts of fresh outside air comprising the steps of, forcing air to circulate through the building at a variable rate, delivering a variable amount of fresh air from outside the building to a gas flame and thence in a thus heated condition into the building at a rate independent of the forced air circulation, bypassing a variable amount of fresh air from outside the building around the gas flame and thence into the building at a rate independent of the forced air circulation, recirculating a variable amount of air inside the building at a rate independent of the forced air circulation, initially adjusting the system so that a predetermined pressure drop occurs across the gas flame when there is a maximum allowed bypass flow and no recirculation, modulating the fresh air delivered to the gas flame and also the recirculated air at rates independent of the forced air circulation so that said predetermined pressure drop is maintained when there is no bypass flow, and modulating the fresh air delivered to the gas flame and also both the recirculated air and bypass air at rates independent of the forced air circulation so that said predetermined pressure drop is maintained when there is both bypass flow and recirculation.

2. A method of heating and ventilating a building such as industrial and commercial buildings and the like with a direct gas-fired system using variable amounts of fresh outside air comprising the steps of, forcing air to circulate through the building at a variable rate, delivering a variable amount of fresh air from outside the building to a gas flame and thence in a thus heated condition into the building, forcing air to circulate through the building at a variable rate, bypassing a variable amount of fresh air from outside the building around the gas flame and thence into the building at a rate independent of the forced air circulation, recirculating a variable amount of air inside the building at a rate independent of the forced air circulation, initially adjusting the system so that a predetermined pressure drop of approximately 0.4-0.6 inches of water column occurs across the gas flame when there is a maximum allowed bypass flow and no recirculation, modulating the fresh air delivered to the gas flame and also the recirculated air at rates independent of the forced air circulation so that said predetermined pressure drop is maintained when there is no bypass flow, and modulating the fresh air delivered to the gas flame and also both the recirculated air and bypass air at rates independent of the forced air circulation so that said predetermined pressure drop is maintained when there is both bypass flow and recirculation.

3. Heating and ventilating apparatus for heating and ventilating a building such as industrial and commercial buildings and the like with a direct gas-fired system using variable amounts of fresh outside air comprising, a gas burner, fan means for forcing air to circulate through the building at a variable rate, means for delivering a variable amount of fresh air from outside the building to said gas burner and thence in a thus heated condition into the building at a rate independent of the forced air circulation, means for bypassing a variable amount of fresh air from outside the building around the gas flame and thence into the building at a rate independent of the forced air circulation, means for recirculating a variable amount of air inside the building at a rate independent of the forced air circulation, said apparatus being initially adjusted so that a predetermined pressure drop occurs across the gas flame when there is a maximum allowed bypass flow ad no recirculation, means for modulating the fresh air delivered to the gas flame and also the recirculated air at rates independent of the forced air circulation so that said predetermined pressure drop is maintained when there is no bypass flow, and means for modulating the fresh air delivered to the gas flame and also both the recirculated air and bypass air at rates independent of the forced air circulation so that said predetermined pressure drop is maintained when there is both bypass flow and recirculation.

4. Heating and ventilating apparatus for heating and ventilating a building such as industrial and commercial buildings and the like with a direct gas-fired system using variable amounts of fresh outside air comprising, fan means for forcing air to circulate through the building at a variable rate, a gas burner, outside air damper means for delivering a variable amount of fresh air from outside the building to said gas burner and thence in a thus heated condition into the building at a rate independent of the forced air circulation, bypass air damper means for bypassing a variable amount of fresh air from outside the building around the gas flame and thence into the building at a rate independent of the forced air circulation, return air damper means for recirculating a variable amount of air inside the building at a rate independent of the forced air circulation, said apparatus being initially adjusted so that a predetermined pressure drop of approximately 0.4-0.6 inches of water column occurs across the gas flame when there is a maximum allowed bypass flow and no recirculation, and means for controlling all said damper means so as to modulate the fresh air delivered to the gas flame and also the recirculated air at rates independent of the forced air circulation so that said predetermined pressure drop is maintained when there is no bypass flow and also to modulate the fresh air delivered to the gas flame and also both the recirculated air and bypass air at rates independent of the force air circulation so that said predetermined pressure drop is maintained when there is both bypass flow and recirculation.

* * * * *